June 1, 1948.　　　　R. F. ZIMMERMAN　　　　2,442,448
ELECTRIC WELDING DEVICE
Filed April 22, 1944　　　　　　　　　　　　　2 Sheets-Sheet 1
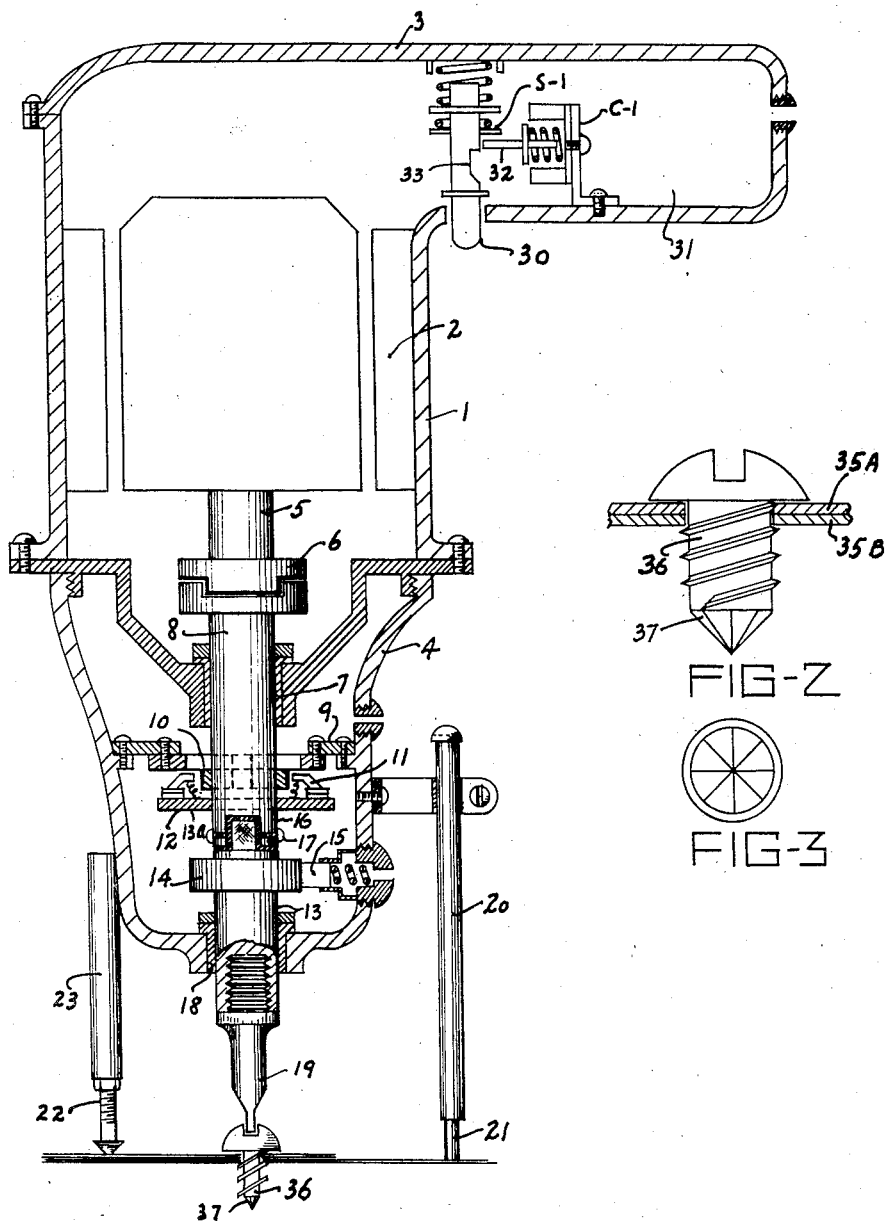
INVENTOR.
Robert F. Zimmerman
BY Allen & Allen
Attorneys

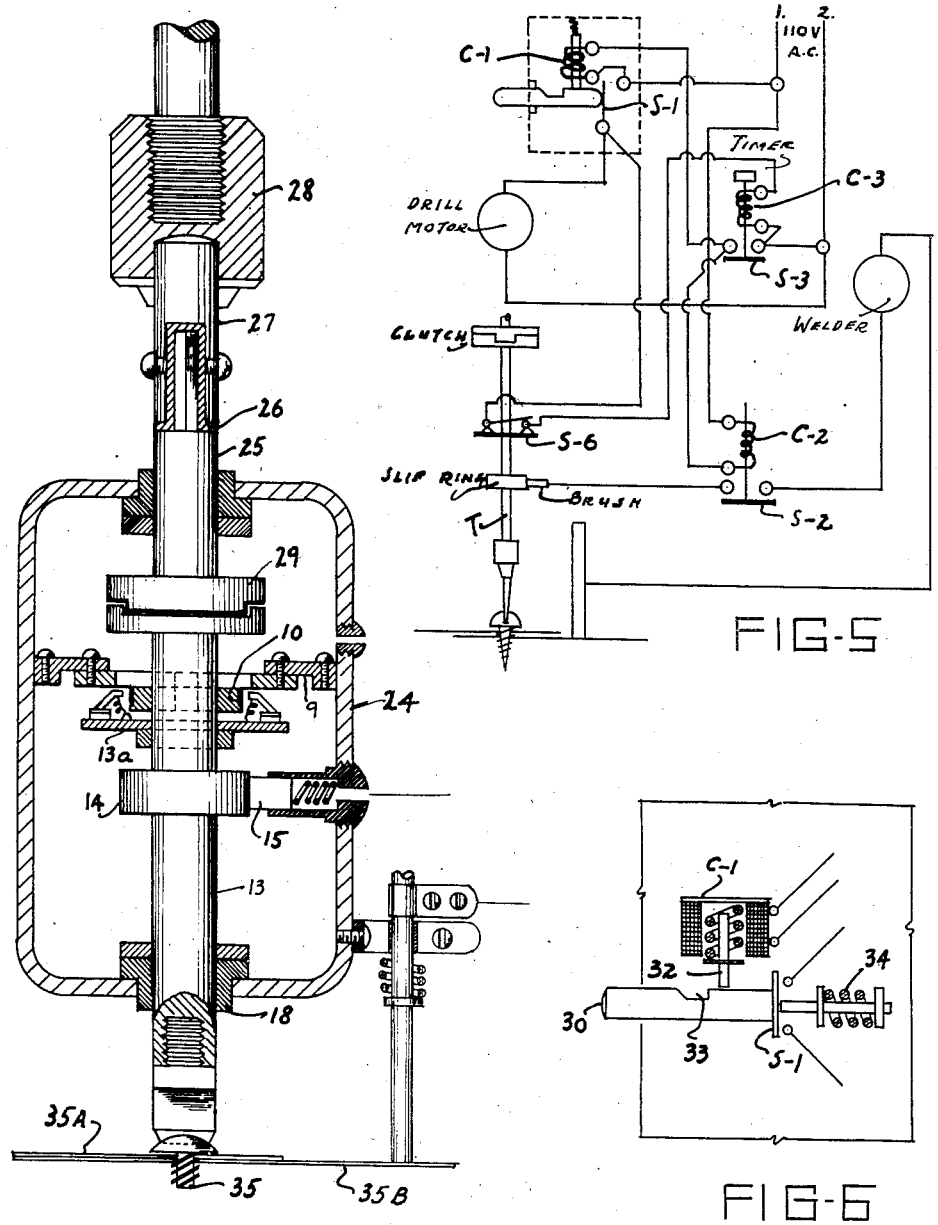

Patented June 1, 1948

2,442,448

UNITED STATES PATENT OFFICE 2,442,448

ELECTRIC WELDING DEVICE

Robert F. Zimmerman, Cincinnati, Ohio, assignor to Lathrop-Hoge Construction Company, Cincinnati, Ohio, a partnership Application April 22, 1944, Serial No. 532,314

8 Claims. (Cl. 219—4)

My invention relates to devices for use in electric welding more particularly in resistance welding as distinguished from arc welding, wherein a rotary holder for the electrode to be used in the welding operation is used to secure a threaded electrode member in place between two or more metal pieces, the squeeze necessary for the weld being the result of turning the threaded electrode into position. By suitable switches and controls a welding current is applied when the adjustable torque on the rotary holder has built up to a position to give the proper squeeze, the current supplied to the electrode through the holder being timed and of proper amperage to weld the electrode in place with the metal of the electrode and of the two or more pieces being joined together.

Preferably the device carries the return circuit terminal on the casing for the holder, which terminal is forced against the work itself in close proximity to the point of operation, thus cutting down greatly those losses which occur due to improper connections and facilitating operations very greatly.

The electrode holder in this case may be an integral part of a hand power drill, or a power driven screw driver or nut runner, or an entirely self-contained auxiliary chuck, adaptable to present tools, or even to a lathe or drill press; in short, any rotating tool or machine, in any case however, containing current collecting devices, proper switches, adjustable clutch, etc. The electrode holder may be magnetic if desirable, or it may incorporate conventional driving or holding devices such as snap chucks or screw driver, at the operator's discretion.

I am aware of the various patented so-called welding guns which are for the purpose of butt welding studs and the like to plates or structural members, by the creation of a large arc caused in a number of well known ways. These devices operate so as to weld studs to one surface only, and they do not concern the matter of joining two or more sheets together with a screw or bolt, such as a sheet metal screw.

Furthermore these tools do not supply a return circuit terminal but require that the return lead be connected at some remote point to the metal sheet or member on which the butt welds are to be made.

Present practice is to fasten the ground or return cable by clamping to some portion of the work being welded, thereby completing the circuit for the flow of welding current from the welding machine or generator through the outgoing lead or cable to the arc, and allowing the "work" to conduct the current passing through the arc, back to the return cable, and thence to the welding generator.

It is the practice of allowing the "work" to be part of the return conductor with which this part of the discussion will deal.

It is commonly known that the cause of much trouble in welding, is lack of attention to the voltage drop in the outgoing and return cables, and generally speaking the return circuit getting the least attention of the two; probably due in great part to the practice of using the "work" as a large portion of the return circuit. The return circuit should be as good as the outgoing lead, though it rarely is. This applies only to cables or circuits carrying welding current and in no way to the generator.

Because the ground or return cable is attached to a structural frame, building, or tank, or work bench, or conveyor in a shop, or a suspended ceiling, does not guarantee a good return circuit. Rivetted structures such as a building, or a conveyor, are definitely known to be insulated by rivet scale. Tack welds in tank erection are not necessarily sound or good conductors. Loose connections in a suspended ceiling are not good conductors. It is practically impossible to secure a conventional type ground in a suspended ceiling by using present methods. Reinforcing bars are scaly and are very poor conductors one to another. In connection with all the aforementioned facts we also have the combination of high current and comparatively low voltage, which condition calls for the best possible return. In other words, a ground or return circuit is good when the voltage drop is no larger than the drop from the welding generator to the electrode, and is bad when it is more. In the aforementioned examples it is always worse, depending on distance traveled through the work.

The present invention definitely precludes any of the hindrances enumerated. It carries its self-contained grounding electrode to a point in most cases not greater than 1½" from the weld being made and sometimes much less, depending on the type of work and amount of current involved. Thus, only a small portion of the "work" serves as a return circuit and the voltage drop is reduced to an absolute minimum. Furthermore, with this tool, in any given type of work the voltage drop is always constant unless the cable is lengthened. Furthermore, having reduced the resistance through the return circuit to a minimum, the same work can be done with consistently lower currents, thus effecting a saving. Furthermore, by maintaining constant drop in the return circuit, the quality of welds is always the same, which is not now the case, insofar as voltage drop affects them. Furthermore, the unit cost per weld is less because the operator does not have to travel long distances and hazardous routes over structures or through machinery to change ground or return connection for the reason that both outgoing and return cables are coaxial and carried right to the tool, and when the tool is moved both leads follow automatically.

It is common knowledge that spot welding (so-called) as practiced by the resistance method, involves the use of stationary equipment which limits its use to shop work or at best in isolated instances, to semi-portable equipment of narrow use. It is also common knowledge that spot or resistance welding utilizes the combination of "heat and squeeze" in joining two or more sheets together, the heat being furnished by resistance to passage through the work of the controlled welding current, which does not form an arc in this case, the pressure being applied at the same time by mechanical means.

My invention, a portable hand tool, has the ability to effect a similar result by the novel use of a sheet metal screw or threaded device of the same nature, the threads of which furnish the "squeeze" or pressure to a predetermined degree through the setting of the torque clutch in the tool and the pitch and shape of the threads to draw and hold the sheets together; and the application of automatically controlled welding current from any conventional source to furnish the heat which is developed mainly by the resistance to the passage of heavy welding current through the "work," but in combination also, and dependent on the intensity of the welding current, and the nature of the materials being welded, the creation of a series of relatively minor arcs or flashes between the sharp edges of the threads of the electrode, and the adjacent sheets, the thin, burred or cut edges, of which are at best only able to conduct light currents, and accordingly, under relatively heavy welding current, immediately become molten, and fuse into adjoining areas, or if displaced cause the arcs to occur. Naturally the control system enters into the exact timing and intensity of the current, so as to control exactly, or within reasonable bounds, the foregoing procedure.

It is to be understood however, that the creation or existence of the arcs is only incidental to the resistance welding procedure, but as such their novel formation and resultant use and advantages in the process are natural and inherent characteristics of this novel method of fastening sheets together. Said welding current is transmitted through the rotary electrode holder (by a current collecting system) which holds a sheet metal screw or threaded fastener magnetically or mechanically, there being on limit to the variety of electrodes or holder shapes. The metal of the threads and screws and the adjacent areas of the sheets tend to fuse together in proportion to the amount of current applied and its duration; and that the amount of fusion or locking can be governed exactly by the automatic electrical timing controls, embodied in the tool or control panel which is an adjunct.

Another distinct and novel advantage obtained by this invention, is the shielding of the welding area to some extent, from the atmosphere, by the head of the rotary electrode, which is comparable to an "umbrella" over the welding area, due to the fact that the head of many screws or bolts, or nuts acting as a head for one end of a bolt, are naturally larger than the body of the screw or bolt to which they are attached. This umbrella effect immediately produces a submerged condition for the largest portion of the welding area. It is obvious that this advantage guarantees cleaner, stronger welds by eliminating atmospheric contamination. It is also obvious that these results are obtained by the inherent nature of the head of the electrode. In this connection, if it is desirable in any given type of work, suitable flux may be applied to the electrode to further enhance the desirable conditions mentioned previously.

This mode of operation immediately opens up the following possibilities: The auxiliary revolving electrode holder (chuck) can be attached to an ordinary portable power driven drill, screw driver, or nut runner, so that nuts may be run on and locked by welding; bolts may be run into assemblies and locked by welding; rivets (sheet metal screws) can be threaded, run in from one side and fused, thus eliminating bucking them up. It naturally is possible to build a tool containing its own rotary power and the necessary controls as a self contained unit.

It is also possible to take as an electrode, a hard self tapping screw of suitable alloy or hardness, capable of making its own way through thin plates such as encountered in duct work, switch gear cubicles, panel boards, etc., with (or without in some cases) pilot drilling previously, and by following the same procedure; also, fasten the plates together or even spot welding thin hangers to the plates by this method.

This tool will go a long way toward overcoming the problem of putting in an airplane rivet from one side of a series of sheets when it it impossible to get at the back of the sheets to buck up the rivet. It also saves the labor of bucking up the rivet where such is possible. Inasmuch as the full cross sectional area of a rivet and its resistance to shear is the chief consideration in a rivet, and inasmuch as any given cross sectional area may be obtained in a sheet metal screw, (the threads being outside of this area), it only is necessary to securely fuse or lock the screw in place so that it will not loosen under longitudinal end stress. My invention accomplishes this.

I have shown an illustrative embodiment of my invention in the appended drawings, and it will be understood that the novelty inherent therein will be set forth in the claims appended to the following specification, to which reference is hereby made.

In the drawings:

Figure 1 is a longitudinal section taken through a device according to my invention having a self contained propulsion motor.

Fig. 2 is an elevation of a special electrode element.

Fig. 3 is an end view thereof.

Fig. 4 is a longitudinal section of an embodiment of my invention in which a separate propulsion tool of some kind is employed, the device being auxiliary equipment.

Fig. 5 is a diagram of suitable electrical connections for the device.

Fig. 6 is a partially diagrammatic view illustrating the operation of the resetting switch arrangement.

The apparatus (Fig. 1) has a generally cylindrical casing 1, which houses an electric motor 2, the upper end of the casing having a handle portion 3 thereon. The motor casing is connected to a casing portion 4 which houses the clutches, and switches, and electrical connections for the welding current. The rotor shaft 5 of the motor is connected by an adjustable torque release type clutch indicated at 6, which may be of any desired type, so as to disengage when torque has been built up to a regulated point. Adjustable clutches such as this are available on the market, and accordingly I indicate the same diagrammatically.

The shaft 8, which is journaled at 7, in the lower end of the casing portion 1, is thus normally engaged through the clutch 6 but will become disconnected when the resistance to rotation of the shaft 8 becomes such that the clutch disengages.

Secured across the casing portion 4 is a plate of insulation 9 which carries a collar within which the shaft 8 rotates, said collar having electrically conductive spaced sectors 10, which when connected together by contact fingers 11, will supply welding current through a time switch to be described. The fingers 11 are pivotally mounted on a disk 12 of insulation material which is fast on the shaft 8, and are held in contact with the conductive sectors by means of springs 13A. However, when the shaft 8 rotates the fingers fly out and hence the connections which are bridged by the spaced sectors cut off the time switch which applies welding current.

Located on the shaft 13 below this centrifugally actuated switch device is a gathering ring 14, which is engaged by a brush 15, mounted in the casing and which is connected to the welding circuit. The shaft 13 is a continuation of the shaft 8 but insulated therefrom by means of a bushing 16 of dielectric material which receives a squared end of the shaft. The pins 17 hold the bushing 16 against rotation.

The lower end of the shaft 13 is carried in a bearing 18, and equipped with any suitable chuck or tool member for engaging the electrode which is to be rotated into the parts to be welded. In the present instance a screw driver head 19 is mounted in the lower end of the shaft.

Located on the side of the casing portion 4 is a sleeve 20 which may be adjustable and is suitably insulated from the casing, and in which is a spring pressed plunger 21 of non-fusible alloy, at the current densities used. This sleeve is connected to the return lead in the welding circuit, and the plunger itself is pressed against the piece to be welded, as will be explained further. Also a plurality of spacing abutment screws 22, may be mounted in other sleeves 23 on the casing.

Referring now to Fig. 4, the parts shown include a casing 24 which corresponds to the casing 4 of Fig. 1. Instead of the device including a motor and its shaft, there is journaled in the upper end of the casing 24, a shaft 25, to which is connected with an insulating bushing 26, an extension shaft 27. The shaft portion 27 is arranged to be engaged by the chuck 28 of any rotary device, such as a power screw driver, or nut turner, or some non-portable machine tool shaft. The cam type clutch 29 is located within the casing 24, in this instance, and otherwise the parts are alike and numbered alike, to those in Fig. 1.

The electrical control box will be normally remotely located from the tool, and be connected to the tool by a cable or cables carrying the required electrical conductors. In the diagram Fig. 5, the tool shaft is indicated at T. The welding current slip ring and brush are labeled. The centrifugal switch is indicated at S—6. The motor and clutch are labeled.

In Fig. 1 is indicated a push button located in the handle portion. This switch button 30 operates a switch in the handle portion which in the diagram is indicated at S—1, the drawings in Fig. 1 showing a box 31 in which the switch S—1 is located. As a part of this switch is a small solenoid C—1, which operates a latch for the switch button holding it in inwardly pressed or contact position, until the solenoid is actuated to lift the spring energized latch pin 32, from the notch 33 in the switch button spindle (see Fig. 6). The bottom is then pressed outwardly to open circuit position by a spring 34 (Fig. 6).

The control box is supplied with 110 volt A. C. current for the motor, which current is used to energize a time lag switch indicated at S—3, the solenoid for closing said switch being indicated at C—3. There is also a supply for welding current which will be of high amperage and low voltage, and this current supply is controlled by a switch S—2 operated by a solenoid C—2. When the time switch operates the switch S—2 is closed, and when after a time lag the switch S—3 opens, the switch S—2 is caused to open in opposition to its solenoid. The physical structure of these various switches may be of desired type, and no attempt has been made to show them in other than diagram.

As so arranged the operation of the tool is as follows: The operator causes the tool to engage the electrode piece, which, in Fig. 4 is shown as a threaded rivet 35, to be screwed into a punched or tapped hole in two plates 35A and 35B which overlap each other along a seam. In Fig. 1 the electrode is a screw 36, which has a drill tip 37 to cut its way through the pieces to be joined and thread itself into them. The electrode might also be a nut to be set over a bolt projecting upwardly from the two members to be joined. These examples are not intended to be exclusively of other arrangements.

Having engaged the electrode, the operator pushes the switch button on the motor casing handle which causes the switch S—1 to close and remain closed in latched position. This starts the motor into operation which will rotate the several shafts connected to the electrode holding or engaging device, and as a result of this rotation will spread the contact fingers of the centrifugal switch and prevent the time switch from closing the time lag for closing being appropriately provided for. The electrode will then be screwed down which will clamp the two plates 35A and 35B tightly together, when the bolt, screw or nut has been forced home. The resistance to rotation then set up will cause the adjustable torque release clutch to open, during which time the bolt, screw or nut will be acting to clamp the two or more plates very tightly together. The electrode holding shaft will then stop, the centrifugal switch will move to circuit closing position and the switch S—3 will close, which in turn closes the welding current switch S—2. Welding current will then flow through the connecting cable to the brush that contacts the conductor ring on the electrode operating shaft.

The positive or negative side of the circuit is applied to the brush, depending on polarity desired, and in either case the cable completing the circuit, is connected to the terminal electrode mounted on the casing of the tool. This electrode is being pressed against the underneath one of the two or more plates, beyond the line of the seam, and will be formed of non-welding material with respect to that with which it is in contact, so as not to fuse. Circuit will be established through the point of squeeze applied by the electrode, and the threads of the electrode and the adjoining metal of the two or more plates being joined will fuse together.

The time switch having been set for a short time period will open after a short, but suitably timed, application of the welding current, which will result in the opening of the welding circuit switch S—2. At the same instant the time switch which is connected to the solenoid C—1, that operates the latch for the push button switch will lift the latch pin permitting the push button switch to open, and the operation is completed.

The importance of the control box is to supply a welding current of the proper timed nature, and the tool itself carries the apparatus which determines the moment of application of the welding current at a time when the squeeze between the parts to be welded has built up to an extent which is required and determined by the clutch arrangement.

The many advantages of a resistance welding operation accompanied by minor arcs as the case may be, such as has been described as a substitute for rivetting parts together is apparent. Where the device is used as an auxiliary tool in connection with some standard type of rotary tool shaft, the push button switch arrangement must be provided for in the motor circuit and connected up with the tool, as will be apparent.

Having thus described my invention by an example of a suitable apparatus embodying the same, what I claim as new and desire to secure by Letters Patent is:

1. A welding tool comprising a rotary driven member for engagement with an electrode which when rotated into the work will apply a pressure suitable for a resistance weld, a torque release clutch for driving the rotary driven member and means controlled by the rotary driven member to apply welding current when the resistance to movement of the electrode has built up sufficiently to release the said torque release clutch.

2. A welding tool comprising a rotary driven member for engagement with an electrode which when rotated into the work will apply a pressure suitable for a resistance weld, and means controlled by the rotary driven member to apply welding current when the resistance to movement of the electrode has built up sufficiently to indicate a proper pressure relation, said means including a centrifugal switch on the driven member, and a means for imparting rotary motion to the driven member which releases upon the building up of torque opposing force against the rotary driven member.

3. A welding tool comprising a rotary driven member for engagement with an electrode which when rotated into the work will apply a pressure suitable for a resistance weld, a torque release clutch for driving the rotary driven member, means controlled by the rotary driven member to apply welding current when the resistance to movement of the electrode has built up sufficiently to release the said torque release clutch, and means for controlling the time of application of the welding current to a momentary application.

4. A welding tool comprising a rotary driven member for engagement with an electrode which when rotated into the work will apply a pressure suitable for a resistance weld, means controlled by the rotary driven member to apply momentary welding current when the resistance to movement of the electrode has built up sufficiently to indicate a proper pressure relation, and a non-fusible electrode at the current densities employed carried by the tool and arranged to be pressed against the work resiliently during the operations on the electrode, said electrode being in said welding circuit, whereby losses due to remote circuit connections are avoided.

5. In a portable electric welding tool, the combination of a supporting structure, a shaft rotatably mounted in said structure, a releasing type clutch, a second shaft connected to the first shaft by said clutch, a third shaft portion connected to the second shaft by an insulated connection, means mounted on said third shaft for engaging an electrode to be used in welding, a slip ring on the third shaft, and brush means for supplying welding current to said slip ring.

6. In a portable electric welding tool the combination of a supporting structure, a shaft rotatably mounted in said structure, a releasing type clutch, a second shaft connnected to the first shaft by said clutch, a third shaft portion connected to the second shaft by an insulated connection, means mounted on said third shaft for engaging an electrode to be used in welding, a slip ring on the third shaft, and brush means for supplying welding current to said slip ring, a centrifugal switch element, a portion thereof being on the second shaft, and arranged upon release of the clutch to close the switch, and an electric control element, arranged upon closing of the said centrifugal switch to apply welding current to the brush means.

7. In a portable electric welding tool the combination of a supporting structure, a shaft rotatably mounted in said structure, a releasing type clutch, a second shaft connected to the first shaft by said clutch, a third shaft portion connected to the second shaft by an insulated connection, means mounted on said third shaft for engaging an electrode to be used in welding, a slip ring on the third shaft, and brush means for supplying welding current to said slip ring, a centrifugal switch element, a portion thereof being on the second shaft, and arranged upon release of the clutch to close the switch, and an electric control element, arranged upon closing of the said centrifugal switch to apply welding current to the brush means, and a return circuit terminal for the electric current mounted resiliently on the said support and arranged to contact the work during the rotation of the electrode in relation to the work, whereby to avoid losses due to remote connection for the return circuit.

8. A mechanical-electrical system for rotating an electrode into work to be united therewith under strain imparted by the rotary motion and applying welding current to said electrode, comprising a manually closed switch, an electrically controlled latch holding it closed, a time switch, a centrifugal switch arranged to close when time has come to apply welding current, an electric motor for rotating the electrode, said motor circuit being closed by the manual switch, a welding current switch, said time switch being in circuit with means to close the welding current switch, and in circuit with the centrifugal switch, said time switch being also in circuit with the electrically controlled latch, whereby the time switch operates to hold the welding current switch in closed position for a predetermined momentary period, and also to release the latch on the manual switch, the time switch coming into operation when resistance to torque set up by rotating the electrode home in the work is proper for application of a resistance welding operation.

ROBERT F. ZIMMERMAN.

REFERENCES CITED

The following references are of record in the file of this patent:

UNITED STATES PATENTS

| Number | Name | Date |
|---|---|---|
| 1,050,827 | Heany | Jan. 21, 1913 |
| 1,074,383 | Rietzel | Sept. 30, 1913 |
| 1,242,171 | Geisenhoner | Oct. 9, 1917 |
| 1,527,797 | Harrison | Feb. 24, 1925 |
| 1,703,541 | Pierson | Feb. 26, 1929 |
| 1,863,850 | Holloway | June 21, 1932 |
| 1,934,780 | Van Halteren | Nov. 14, 1933 |
| 1,995,001 | Ito | Mar. 19, 1935 |
| 2,018,263 | Ito | Oct. 22, 1935 |
| 2,343,998 | Powell | Mar. 14, 1944 |